US012776958B2

(12) United States Patent
Atarius

(10) Patent No.: US 12,776,958 B2
(45) Date of Patent: Oct. 27, 2026

(54) INTERFACING SERVICES OF AN APPLICATION DATA ANALYTICS ENABLER SERVER

(71) Applicant: Lenovo (Singapore) Pte. Limited, Singapore (SG)

(72) Inventor: Roozbeh Atarius, La Jolla, CA (US)

(73) Assignee: Lenovo (Singapore) Pte. Limited, Singapore (SG)

( * ) Notice: Subject to any disclaimer, the term of this patent is extended or adjusted under 35 U.S.C. 154(b) by 64 days.

(21) Appl. No.: 18/930,808

(22) Filed: Oct. 29, 2024

(65) Prior Publication Data

US 2025/0141753 A1 May 1, 2025

Related U.S. Application Data

(60) Provisional application No. 63/594,647, filed on Oct. 31, 2023.

(51) Int. Cl.
*H04L 41/14* (2022.01)
*G06F 9/54* (2006.01)

(52) U.S. Cl.
CPC .............. *H04L 41/14* (2013.01); *G06F 9/541* (2013.01)

(58) Field of Classification Search
None
See application file for complete search history.

(56) References Cited

U.S. PATENT DOCUMENTS

2025/0047566 A1* 2/2025 Pateromichelakis ... H04L 41/14
2025/0158892 A1* 5/2025 Pateromichelakis . H04W 80/08
2025/0300897 A1* 9/2025 Pateromichelakis ........................ H04L 41/0833

FOREIGN PATENT DOCUMENTS

WO 2023104346 A1 6/2023
WO 2025052359 A1 3/2025

OTHER PUBLICATIONS

3GPP TS 29.575 v18.3.0. 3rd Generation Partnership Project; Technical Specification Group Core Network and Terminals; 5G System; Analytics Data Repository Services; Stage 3 (Release 18). 79 pages. Jul. 2023. (Year: 2023).*
ETSI TS 129 552 v17.4.0. 5G; 5G System; Network Data Analytics signalling flows; Stage 3 (3GPP TS 29.552 version 17.4.0 Release 17). Apr. 2023. 91 pages. (Year: 2023).*

(Continued)

*Primary Examiner* — Jeffrey R Swearingen
(74) *Attorney, Agent, or Firm* — FIG. 1 Patents

(57) ABSTRACT

Various aspects of the present disclosure relate to interfacing services of an application data analytics enabler server (ADAES). An apparatus, such as a network equipment (NE), receives, from an analytics consumer, a request for analytics data via an application program interface (API). The API can be configured as a single API via which multiple events are accessible, where each of the multiple events are distinguishable by an event-specific identifier. Alternatively, the API can be configured as multiple APIs by which one event of the multiple events is accessible via one of the multiple APIs, and the one event is distinguishable by an API-specific identifier and the event-specific identifier. The NE transmits a response to the request for the analytics data to the analytics consumer.

20 Claims, 8 Drawing Sheets

(56) References Cited

OTHER PUBLICATIONS

3rd Generation Partnership Proje , "Functional architecture and information flows for Application Data Analytics Enablement Service", 3GPP TS 23.436 V18.1.0 (Sep. 2023) [retrieved from the internet on Jan. 6, 2025], <https://portal.3gpp.org/desktopmodules/Specifications/SpecificationDetails.aspx?specificationId=4132>, Sep. 2023, 65 pages.
"Technical Specification Group Core Network and Terminals Application Data Analytics Enablement Service; Stage 3", 3GPP TS 24.559 V0.2.0, Oct. 2023, 15 pages.
"Technical Specification Group Core Network and Terminals; 5G System; Network Data Analytics Services; Stage 3", 3GPP TS 29.520 V18.3.0, Sep. 2023, 358 pages.
"Technical Specification Group Core Network and Terminals; 5G System; Network Exposure Function Northbound APIs; Stage 3", 3GPP TS 29.522 V17.11.0 <2 of 2>, Sep. 2023, 542 pages.
"Technical Specification Group Core Network and Terminals; 5G System; Network Exposure Function Northbound APIs; Stage 3", 3GPP TS 29.522 V17.11.0 <1 of 2>, Sep. 2023, 542 pages.
"Technical Specification Group Core Network and Terminals; Service Enabler Architecture Layer for Verticals (SEAL); Application Programming Interface (API) specification; Stage 3", 3GPP TS 29.549 V18.3.0, Sep. 2023, 238 pages.
"International Search Report and Written Opinion", International Application No. PCT/IB2024/060709, Jan. 23, 2025, 12 pages.

* cited by examiner

INTERFACING SERVICES OF AN APPLICATION DATA ANALYTICS ENABLER SERVER

RELATED APPLICATION

This application claims priority to U.S. Provisional Application Ser. No. 63/594,647 filed Oct. 31, 2023 entitled "Interfacing Services of an Application Data Analytics Enabler Server," the disclosure of which is incorporated by reference herein in its entirety.

TECHNICAL FIELD

The present disclosure relates to wireless communications, and more specifically to one or more application program interfaces (APIs) for services of an application data analytics enabler server (ADAES).

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

An ADAES in a wireless communications system provides services for data collection of performance analytics, as well as subscription access to the analytics data. Vertical-specific applications and edge applications are consumers of data analytics services, and the application enablement layer provides access to the data analytics services. An application data analytics enablement (ADAE) client and an ADAE server supports vertical application layer (VAL) applications, and the ADAE supports interaction with network equipment to access network and management data analytics services.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

Some implementations of the method and apparatuses described herein may further include a network equipment (NE) for wireless communication to receive, from an analytics consumer, a request for analytics data via an API. The API is configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier. The NE transmits a response to the request for the analytics data to the analytics consumer.

In some implementations of the method and apparatuses described herein, the request includes a resource configuration that indicates a type of the analytics data for at least one of a data analytics service or an application; and the NE receives the request for the analytics data of the at least one service or application via the API, or receives the request for the analytics data of the application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The NE receives the request from the analytics consumer as a subscription request of an event; transmits a session request for the analytics consumer to an application data analytics enabler client (ADAEC); receives session confirmation from the ADAEC; and transmits the response to the analytics consumer with an indication of acceptance of the subscription request. The NE receives the request from the analytics consumer for the analytics data as the request for historical analytics data; transmits an analytics request to an application layer-analytical data repository function (A-ADRF) for the historical analytics data; receives the historical analytics data from the A-ADRF; and transmits the response of the historical analytics data to the analytics consumer. The NE transmits, to the analytics consumer, the response to the request for the analytics data via the API by which the request was received, the API configured with an extension that indicates a type of the response. The NE is an ADAES, and the analytics consumer is a VAL server requesting the analytics data for at least one of VAL server performance analytics or VAL session performance analytics. The NE is an ADAES, and the analytics consumer is an application requesting the analytics data for slice-specific performance analytics. The NE is an ADAES, and the analytics consumer is a UE requesting the analytics data for UE-to-UE application performance analytics. The NE is an ADAES, and the analytics consumer is an application requesting the analytics data for location accuracy analytics. The NE is an ADAES, and the analytics consumer is an application requesting the analytics data for service API analytics. The NE is an ADAES, and the analytics consumer is an application requesting the analytics data for network slice usage pattern analytics. The NE is an ADAES, and the analytics consumer is an application requesting the analytics data for edge load analytics. The NE is an ADAES, and the analytics consumer is an application requesting the analytics data for application performance analytics.

Some implementations of the method and apparatuses described herein may further include a method performed by a NE, the method including receiving, from an analytics consumer, a request for analytics data via an API. The API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API specific identifier and the event-specific identifier. The method including transmitting a response to the request for the analytics data to the analytics consumer.

In some implementations of the method and apparatuses described herein, the request includes a resource configuration that indicates a type of the analytics data for at least one of a data analytics service or an application; and receiving the request for the analytics data of at least one of the service or the application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The method further comprising receiving the request from the analytics consumer as a subscription request of an event; transmitting a session request for the analytics consumer to an ADAEC; receiving session confirmation from the ADAEC; and transmitting the response to the analytics consumer with an indication of acceptance of the subscription request. The method further comprising: receiving the request from the analytics consumer for the analytics data as the request for historical analytics data; transmitting an analytics request to an A-ADRF for the historical analytics data; receiving the historical analytics data from the A-ADRF; and transmitting the response of the historical analytics data to the analytics consumer. The method further comprising transmitting, to the analytics consumer, the response to the request for the analytics data via the API by which the request was received, the API configured with an extension that indicates a type of the response. The NE is an ADAES, and the analytics consumer is a VAL server requesting the analytics data for at least one of VAL server performance analytics or VAL session performance analytics. The NE is an ADAES, and the analytics consumer is a UE requesting the analytics data for UE-to-UE application performance analytics. The NE is an ADAES, and the analytics consumer is an application requesting the analytics data for at least one of slice-specific performance analytics, location accuracy analytics, service API analytics, network slice usage pattern analytics, edge load analytics, or application performance analytics.

Some implementations of the method and apparatuses described herein may further include a UE for wireless communication to transmit, to an ADAES, a request for analytics data via an API. The API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier. The UE receives a response to the request for the analytics data from the ADAES.

In some implementations of the method and apparatuses described herein, the request includes a resource configuration that indicates a type of the analytics data for at least one of a data analytics service or an application; and the UE transmits the request for the analytics data of the at least one service or application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The UE transmits the request to the ADAES as a subscription request of an event; and receives the response from the ADAES with an indication of acceptance of the subscription request. The UE transmits the request to the ADAES for the analytics data as the request for historical analytics data; and receives the response of the historical analytics data from the ADAES. The UE receives, from the ADAES, the response to the request for the analytics data via the API by which the request was transmitted, the API configured with an extension that indicates a type of the response. The UE is an analytics consumer requesting the analytics data for UE-to-UE application performance analytics. The UE is an analytics consumer requesting the analytics data for location accuracy analytics. The UE is an analytics consumer requesting the analytics data for application performance analytics.

Some implementations of the method and apparatuses described herein may further include a processor for wireless communication to transmit, to an ADAES, a request for analytics data via an API. The API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier. The processor receives a response to the request for the analytics data from the ADAES.

In some implementations of the method and apparatuses described herein, the request includes a resource configuration that indicates a type of the analytics data for at least one of a data analytics service or an application; and the processor transmits the request for the analytics data of the at least one service or application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The processor transmits the request to the ADAES as a subscription request of an event; and receives the response from the ADAES with an indication of acceptance of the subscription request. The processor transmits the request to the ADAES for the analytics data as the request for historical analytics data; and receives the response of the historical analytics data from the ADAES. The processor receives, from the ADAES, the response to the request for the analytics data via the API by which the request was transmitted, the API configured with an extension that indicates a type of the response. The processor of a UE is an analytics consumer requesting the analytics data for UE-to-UE application performance analytics. The processor of a UE is an analytics consumer requesting the analytics data for location accuracy analytics. The processor of a UE is an analytics consumer requesting the analytics data for application performance analytics.

Some implementations of the method and apparatuses described herein may further include a method performed by a UE, the method including transmitting, to an ADAES, a request for analytics data via an API. The API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier. The method including receiving a response to the request for the analytics data from the ADAES.

In some implementations of the method and apparatuses described herein, the request includes a resource configuration that indicates a type of the analytics data for at least one of a data analytics service or an application; and transmitting the request for the analytics data of the at least one service or application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The method further comprising transmitting the request to the ADAES as a subscription request of an event; and receiving the response from the ADAES with an indication of acceptance of the subscription request. The method further comprising transmitting the request to the ADAES for the analytics data as the request for historical analytics data; and receiving the response of the historical analytics data from the ADAES. The method further comprising receiving, from the ADAES, the response to the request for the analytics data via the API by which the request was transmitted, the API configured with an extension that indicates a type of the response. The UE is an analytics consumer requesting the analytics data for UE-to-UE application performance analytics. The UE is an analytics consumer requesting the analytics data for location accuracy analytics. The UE is an analytics consumer requesting the analytics data for application performance analytics.

DETAILED DESCRIPTION

A wireless communications system includes an ADAES that provides services for data collection of performance analytics, as well as subscription access to the analytics data. As used herein, ADAES refers to an application data analytics enabler server that implements event services (e.g., the application data analytics enablement services). In current implementations, the APIs for functional descriptions of the application data analytics enablement services are undefined.

An application data analytics enablement procedure, as well as resource URI structures of one or more APIs, are described. By utilizing the described techniques, an analytics consumer can request or subscribe to the ADAES for the analytics data of a service. The request or subscription may have different aspects, such as due to the type of analytics data requested or subscribed, and/or for each application. To distinguish the nature of the requests or subscriptions, the analytics consumer can utilize one API, where the services are distinguishable by service or application specific suffixes. Alternatively, the analytics consumer can utilize multiple APIs, each specifically for a different one of the services, and requests within that service or application are distinguishable by API specific suffixes.

Aspects of the disclosure are directed to an API, which can be implemented as a unique API with a unique name for all the event services provided by ADAES, or alternatively, each service can be accessed via its own API, which is a multiple API approach to implement the functional descriptions of the application data analytics enablement ADAE layer. The described techniques enable implementation of stage three (3) of the ADAES, providing two different options for creating APIs for the service events of the ADAES. Notably, a first implementation utilizes a common API which is valid for all of the service events of the ADAES. A second implementation utilizes a unique API for each service event, and several distinct APIs are used for service events of the ADAES.

Aspects of the present disclosure are described in the context of a wireless communications system.

Figure 1:
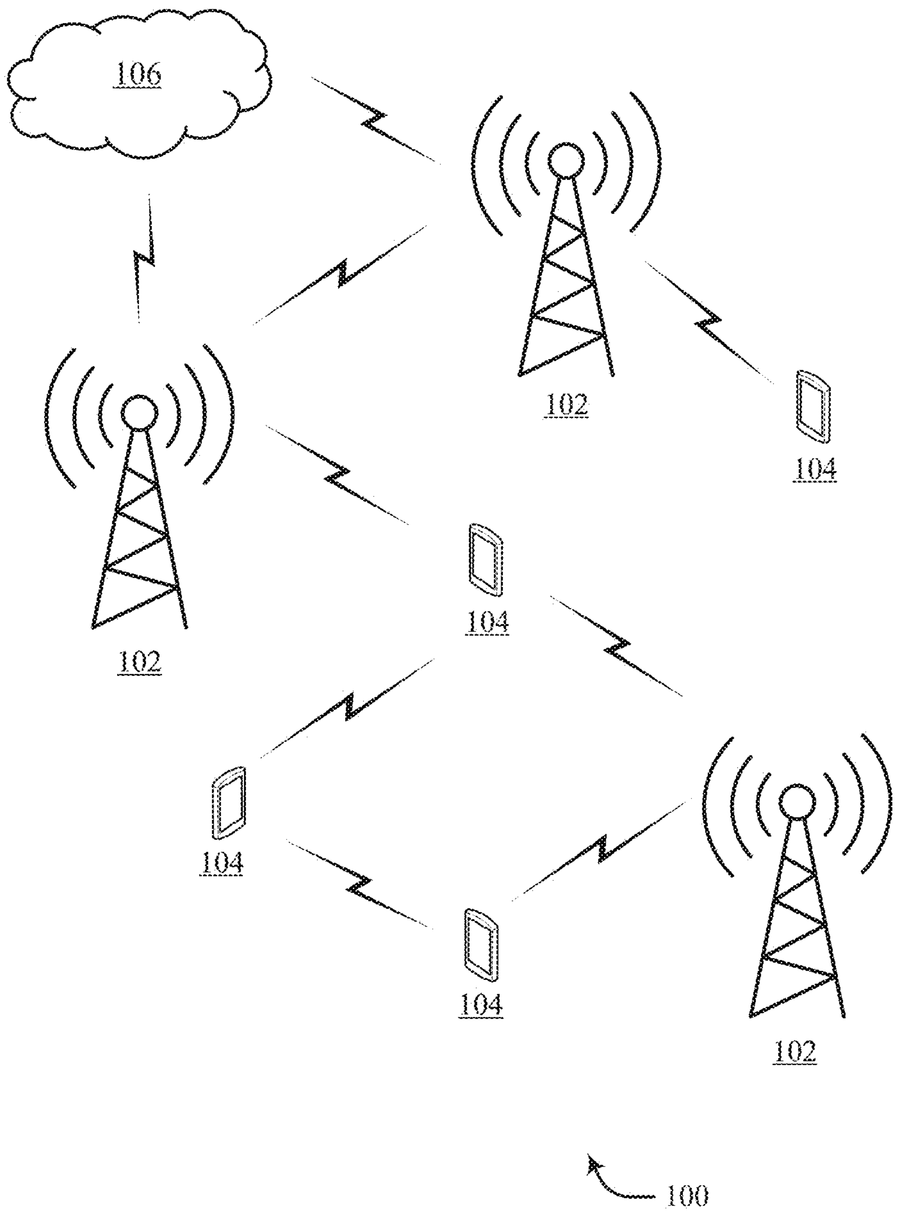
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UEs 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally, or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHZ), FR2 (24.25 GHz-52.6 GHz), FR3 (7.125 GHZ-24.25 GHZ), FR4 (52.6 GHz-114.25 GHz), FR4a or FR4-1 (52.6 GHz-71 GHZ), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

According to implementations, one or more of the NEs 102 and the UEs 104 are operable to implement various aspects of the techniques described with reference to the present disclosure. For example, a NE 102 (e.g., an ADAES) receives, from an analytics consumer (e.g., a UE 104), a request for analytics data via an API. In implementations, the API is configured as a single API via which multiple events are accessible, where each of the multiple events are distinguishable by an event-specific identifier. Alternatively, the API is configured as multiple APIs by which one event of the multiple events is accessible via one of the multiple APIs, and the one event is distinguishable by an API-specific identifier and the event-specific identifier. The NE 102 transmits a response to the request for the analytics data to the analytics consumer. In another example, a UE 104 (e.g., an analytics consumer) transmits, to an ADAES, a request for the analytics data via the API, where the API is configured as a single API via which multiple events are accessible, where each of the multiple events are distinguishable by an event-specific identifier. Alternatively, the API is configured as multiple APIs by which one event of the multiple events is accessible via one of the multiple APIs, and the one event is distinguishable by an API-specific identifier and the event-specific identifier. The UE 104 receives a response to the request for the analytics data from the ADAES.

Figure 2:
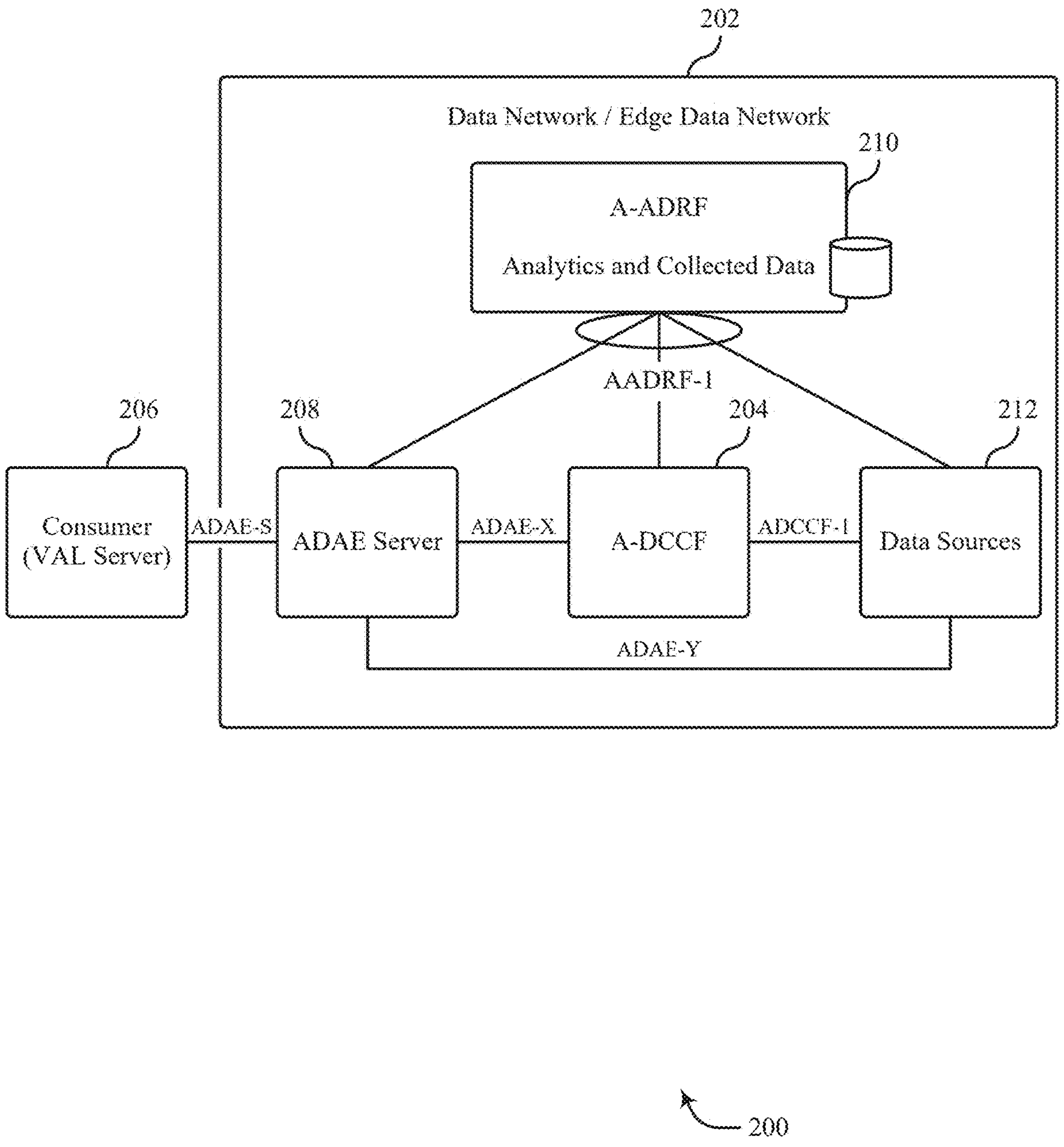
FIG. 2 illustrates an example of ADAE internal functional architecture in accordance with aspects of the present disclosure.

FIG. 2 illustrates an example of an ADAE internal functional architecture 200 in accordance with aspects of the present disclosure. The specification for functional architecture and information flows for ADAES in 3GPP specifies the procedures, information flows, and APIs utilized for ADAE service enabler architecture layer (SEAL) service. The SEAL service provides common services, such as group management, configuration management, and location management that can be utilized by any number of vertical applications. The ADAE internal functional architecture 200 implemented in a data network or edge data network 202 illustrates the generic functional model for ADAE when re-using the 3GPP network data analytics model.

With reference to functionalities of the ADAE internal functional architecture 200, an application layer implements a data collection and coordination function (A-DCCF) 204, which coordinates the collection and distribution of analytics data requested by a consumer 206 (e.g., a VAL server; an ADAE server). The data collection coordination is supported by the A-DCCF. The ADAE server 208 can send requests for analytics data to the A-DCCF rather than directly to the data sources. The A-DCCF can also perform data processing and/or abstraction, as well as data preparation based on VAL server requirements. An application layer also implements an A-ADRF 210, which stores historical data and/or analytics data (i.e., data and/or analytics related to a past time period that has been obtained by the consumer (e.g., the ADAE server)). After the consumer obtains the historical data and/or the analytics data, the consumer may store the historical data and/or the analytics data in an A-ADRF. In implementations, the consumer can directly contact the A-ADRF, or access the A-ADRF via the A-DCCF, based on a configuration.

The data sources 212 in the ADAE internal functional architecture 200 can include 5GS data sources (5GC (5G core network); operation, administration, and maintenance (OAM)), enablement layer data sources (SEAL, edge enabler layer (EEL)), or external data sources at the data network (DN) side (VAL server; edge application server (EAS)) and VAL UEs. The A-DCCF and the A-ADRF can be used for interacting with certain data sources (e.g., 5GC, OAM) based on configuration, and can be hidden from the VAL layer. A functional description of the ADAE layer is summarized to include support for various features, as described following.

The ADAE layer provides support for application performance analytics that provide insight on the operation and performance of an application, in particular statistics or predictions on parameters related to the application. The ADAE layer also provides support for slice-specific application performance analytics that provide insight on the performance of the VAL applications when using a given network slice, such as from a list of subscribed slices for a VAL customer.

The ADAE layer provides support for UE-to-UE application performance analytics for the derivation and exposure of application layer analytics to predict the performance of an application session among two or more VAL UEs within a service or group. Such prediction relates to application QOS attributes prediction for a given time horizon and area. The ADAE layer also provides support for location accuracy analytics to allow a VAL server to be notified based on analytics whether the accuracy of a location can be met for a given application and optionally for a given UE or group route.

The ADAE layer provides support for service API analytics that allow a VAL server or any other consumer (e.g., an API provider) to be notified on the predicted and/or statistic availability and service level for the requested service API analytics. The ADAE layer also provides support for slice usage pattern analytics that provide network slice usage pattern analytics based on collected network slice performance and analytics, historical network slice status, and network performance to help the analytics consumer manage the network slice.

The ADAE layer provides support for edge load analytics to provide insight on the operation and performance of an edge data network (EDN), and in particular statistics or predictions on parameters related to the EAS and/or edge enabler server (EES) load for one or more EAS/EES, and edge platform load parameters, which include the aggregated load per EDN or per data network access identifier (DNAI) due to the edge support services (and e.g., the load level of edge computational resources). The ADAE layer also provides support for the collection of service experience information from the ADAE clients to support application performance analytics.

Figure 3:
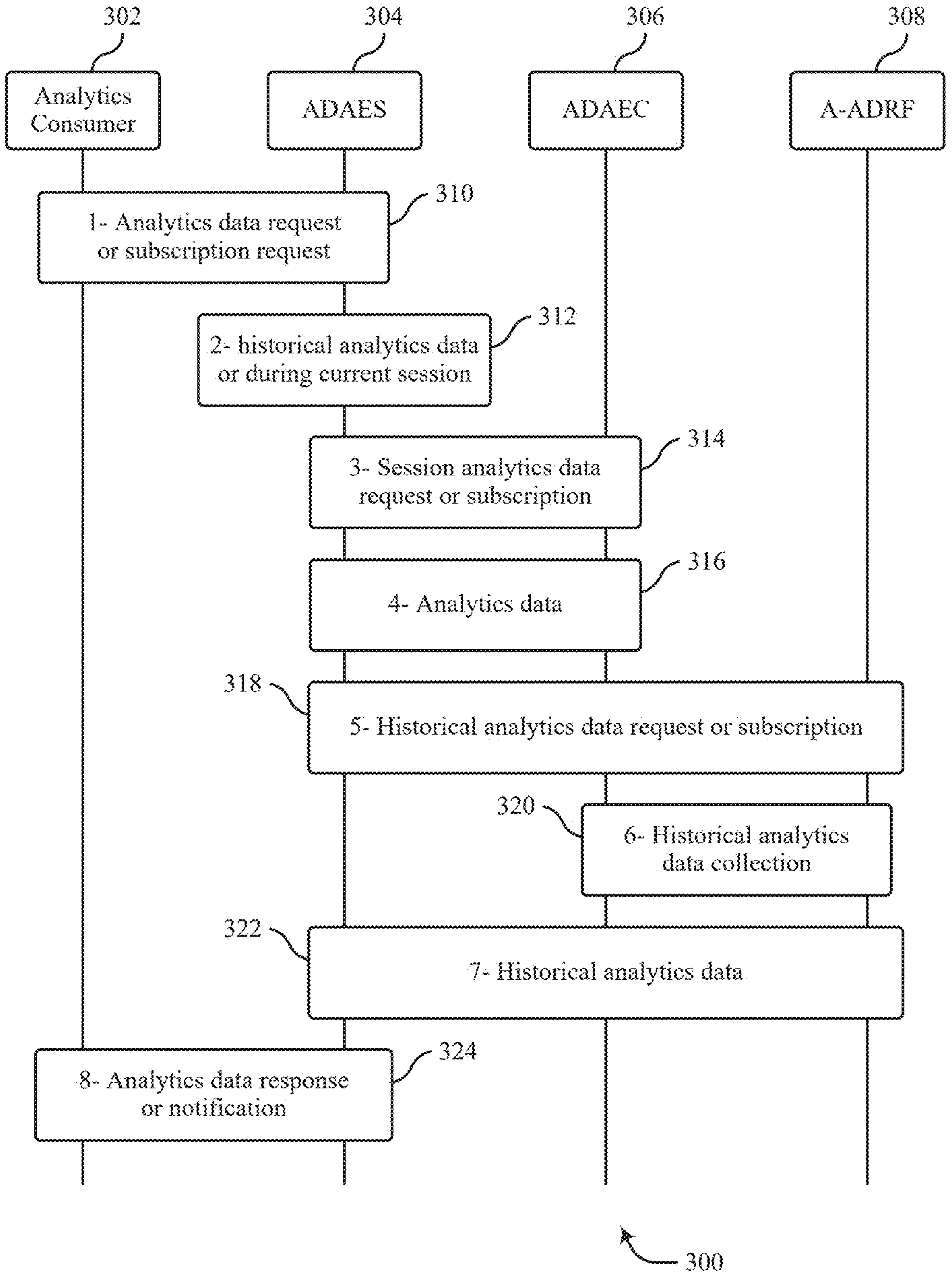
FIG. 3 illustrates an example of an application data analytics enablement procedure in accordance with aspects of the present disclosure.

FIG. 3 illustrates an example of an application data analytics enablement procedure 300 in accordance with aspects of the present disclosure. The example procedure 300 is a generalized model, where an analytic consumer request for a subscription to the analytics or for a direct request (without subscription) to the analytics. The subscription or the direct request for the analytics may be for an ongoing session or for historical analytics. The generalized model of this example procedure 300 includes an analytics consumer 302, an application data analytics enabler server (ADAES) 304, an application data analytics enabler client (ADAEC) 306, and an application layer-analytical data repository function (A-ADRF) 308.

At 310 in the example procedure 300, the analytics consumer 302 requests or subscribes to the ADAES for the analytics of a service. The request or subscription may have different natures, such as due to the type of analytics requested or subscribed, and/or for each application. To distinguish the nature of the requests or subscriptions, the analytics consumer can utilize one API, where the services are distinguished by service or application specific suffixes. Alternatively, the analytics consumer can utilize multiple APIs, each specifically for a different one of the services, and requests within that service or application are distinguished by API specific suffixes. If the analytics consumer 302 has transmitted (e.g., communicated, sent) a subscription request associated with an event, and if the analytics consumer is authorized for the subscription, then the ADAES 304 responds with an acceptance for the subscription.

At 312 in the example procedure 300, the ADAES 304 evaluates whether the request or subscription request is for analytics of an ongoing session or for historical analytics data. If the request or subscription request is for an ongoing session, then at 314, the ADAES 304 requests the analytics from the ADAEC 306. This may be for a subscription to the analytics, where the ADAEC notifies the ADAES with the analytics data due to a certain condition which is fulfilled as an indication to the ADAEC to notify the ADAES. At 316, the analytics data is provided to the ADAES once the condition is fulfilled and the ADAEC can provide the analytics data.

If the request or subscription request is for historical analytics data, then at 318, the ADAES 304 requests the historical analytics data from the A-ADRF 308. This may be for a subscription to the historical analytics data, where the A-ADRF notifies the ADAES with the analytics data due to a certain condition which is fulfilled as an indication to the A-ADRF to notify the ADAES. At 320, the A-ADRF collects the historical analytics data from the ADAEC 306. Note that the A-ADRF may collect the historical analytics data even without receiving a request from the ADAES. At 322, the historical analytics data is provided to the ADAES once the condition is fulfilled and the A-ADRF can provide the historical analytics data. Upon receipt of the analytics data, the ADAES 304 transmits (e.g., communicates, sends) the analytics data to the analytics consumer 302 at 324 by responding or notifying the analytics consumer and providing the analytics data by using the same API, but with a new extension identifying the nature of the response (e.g., an indication that the response is a notification for the subscription).

Aspects of the present disclosure include solutions for a resource URI and API URI for event triggered ADAES configuration. The described techniques enable implementation of stage three (3) of the ADAES, providing two different options for creating APIs for the service events of the ADAES. Notably, a first implementation utilizes a common API which is valid for all of the service events of the ADAES. A second implementation utilizes a unique API for each service event, and several distinct APIs are used for service events of the ADAES.

Figure 4:
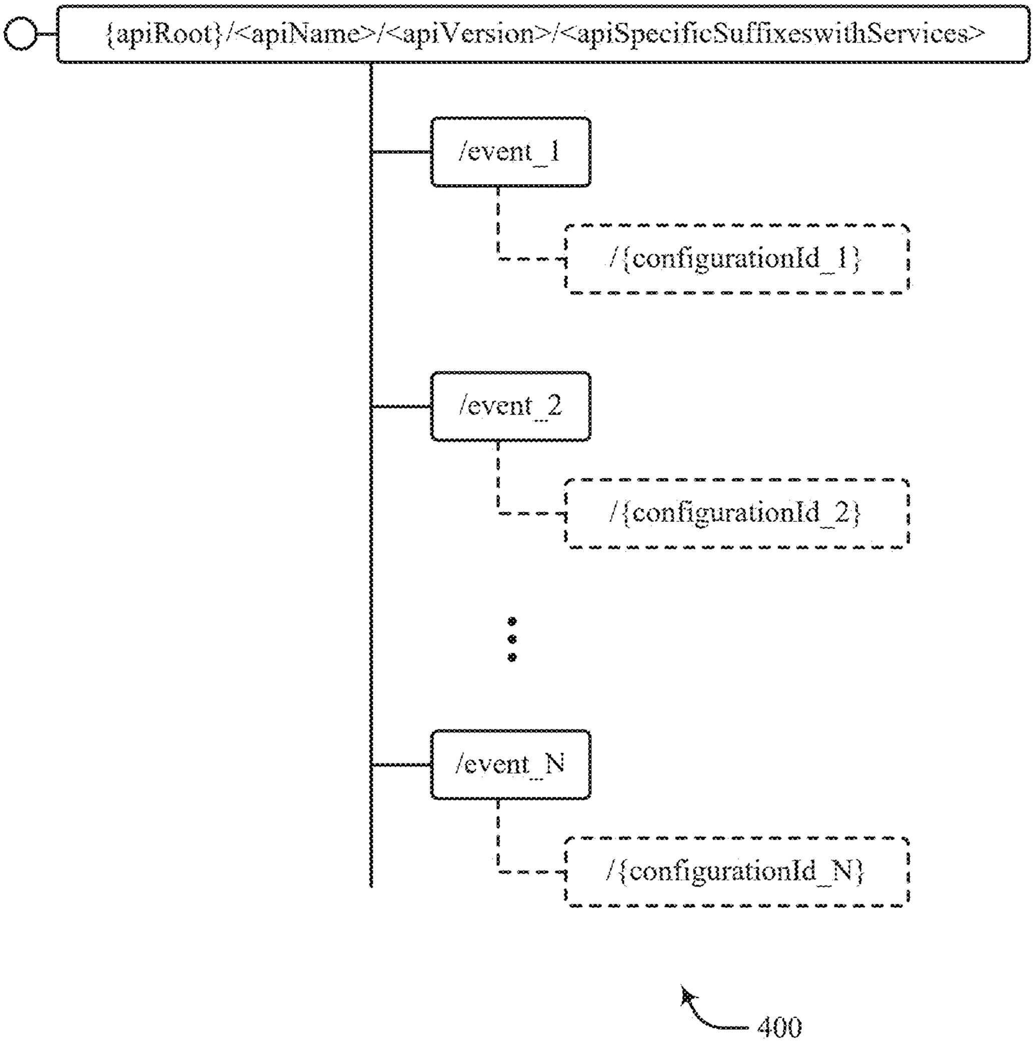
FIG. 4 illustrates an example of a resource uniform resource identifier (URI) structure of an API in accordance with aspects of the present disclosure.

FIG. 4 illustrates an example of a resource URI structure 400 of an API in accordance with aspects of the present disclosure. This resource URI structure 400 of one API, such as for the ADAES_Configuration API, can be used to implement the application data analytics enablement procedure 300 as shown and described with reference to FIG. 3. In this example, a dashed line indicates that the {configurationId} associated with a service event may not be needed, and additionally, it may be considered that the <apiName> may be set as a chosen name, such as "adae-config", and the <apiVersion> may be set to a version number, such as "v1".

As shown in the resource URI structure 400, each service event (e.g., /event_1, /event_2, . . . /event_N) refers to one service event and the resource URI, and in an example of a resource URI {apiRoot}/adae-config/v1/<event_i>/{configurationId_i}, the {configurationId_i} may not exist for some service events. The following Table indicates an example overview of resource and methods:

| Resource name | Resource URI | HTTP method | Description |
|---|---|---|---|
| Application performance event subscription | /application-performance | POST | Subscription to the application performance analytics |
| Application performance analytics | /application-performance/{configurationId} | GET | Retrieves the application performance analytics identified by {configurationId} |
| | | PUT | Replaces the application performance analytics identified by {configurationId} |
| Slice specific application performance event subscription | /slice-specific-application-performance | POST | Subscription to the slice-specific application performance analytics |
| Location accuracy event subscription | /location-accuracy | POST | Subscription to the location accuracy analytics |
| Location accuracy analytics | /location-accuracy/{configurationId} | GET | Request for location accuracy analytics identified by {configurationId} |
| | | PUT | Updates the location accuracy analytics identified by {configurationId} |

In this resource URI structure 400, the same API defines the resource URIs, such as:

the resource URIs for resources application performance event subscription and application performance analytics as:

{apiRoot}/adae-config/v1/application-performance for HTTP POST method; and

{apiRoot}/adae-config/v1/application-performance/{configurationId_i} for HTTP GET and HTTP PUT methods;

the resource URIs for resource slice-specific application performance event subscription as: {apiRoot}/adae-config/v1/slice-specific-application-performance for HTTP POST method; and the resource URIs for resources location accuracy event subscription and location accuracy analytics as:

{apiRoot}/adae-config/v1/location-accuracy for HTTP POST method; and

{apiRoot}/adae-config/v1/location-accuracy {configurationId_i} for HTTP GET and HTTP PUT methods.

Figure 5:
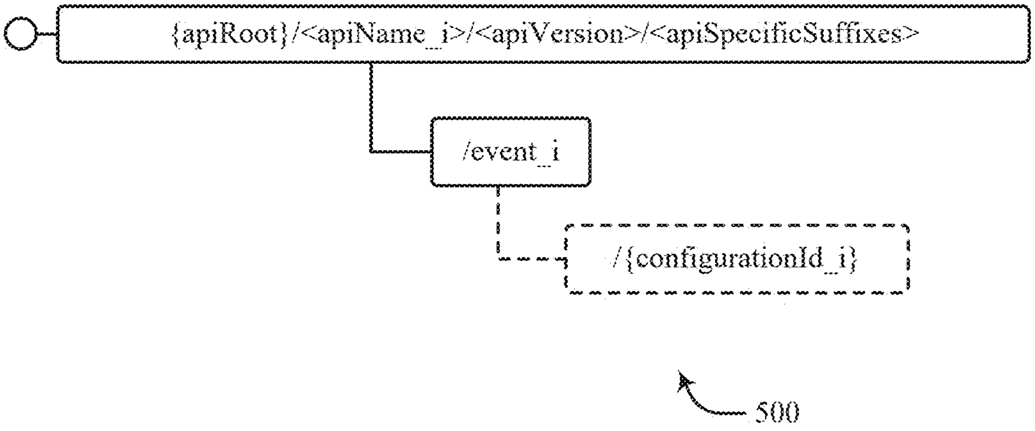
FIG. 5 illustrates an example of a resource URI structure of an API in accordance with aspects of the present disclosure.

FIG. 5 illustrates an example of a resource URI structure 500 of an API in accordance with aspects of the present disclosure. This resource URI structure 500 of the API is used to create N-APIs that are used to implement the application data analytics enablement procedure 300 as shown and described with reference to FIG. 3. This resource URI structure 500 is used to create the N-APIs, as compared to the one API shown and described with reference to FIG. 4. In this example, a dashed line indicates that the {configurationId_i} associated with a service event may not be needed, and additionally, it may be considered that the <apiName_i> may be set as a chosen name, such as "adae config_i", and the <apiVersion> may be set to a version number, such as "v1".

As shown in the resource URI structure 500, a service event (e.g., /event_i) refers to one service event and the resource URI, and in an example of a resource URI {apiRoot}/adae-config_i/v1/<event_i>/{configurationId_i}, the {configurationId_i} may not exist for some service events. In the Table above, the same example can now be implemented with three (3) APIs, one for each service event, which are:

the resource URIs for resources application performance event subscription and application performance analytics as:

{apiRoot}/adae-config_1/v1/application-performance for HTTP POST method; and

{apiRoot}/adae-config_1/v1/application-performance/{configurationId_i} for HTTP GET and HTTP PUT methods;

the resource URIs for resource slice-specific application performance event subscription as: {apiRoot}/adae-config_2/v1/slice-specific-application-performance for HTTP POST method; and the resource URIs for resources location accuracy event subscription and location accuracy analytics as:

{apiRoot}/adae-config_3/v1/location-accuracy for HTTP POST method; and

{apiRoot}/adae-config_3/v1/location-accuracy {configurationId_i} for HTTP GET and HTTP PUT methods.

Figure 6:
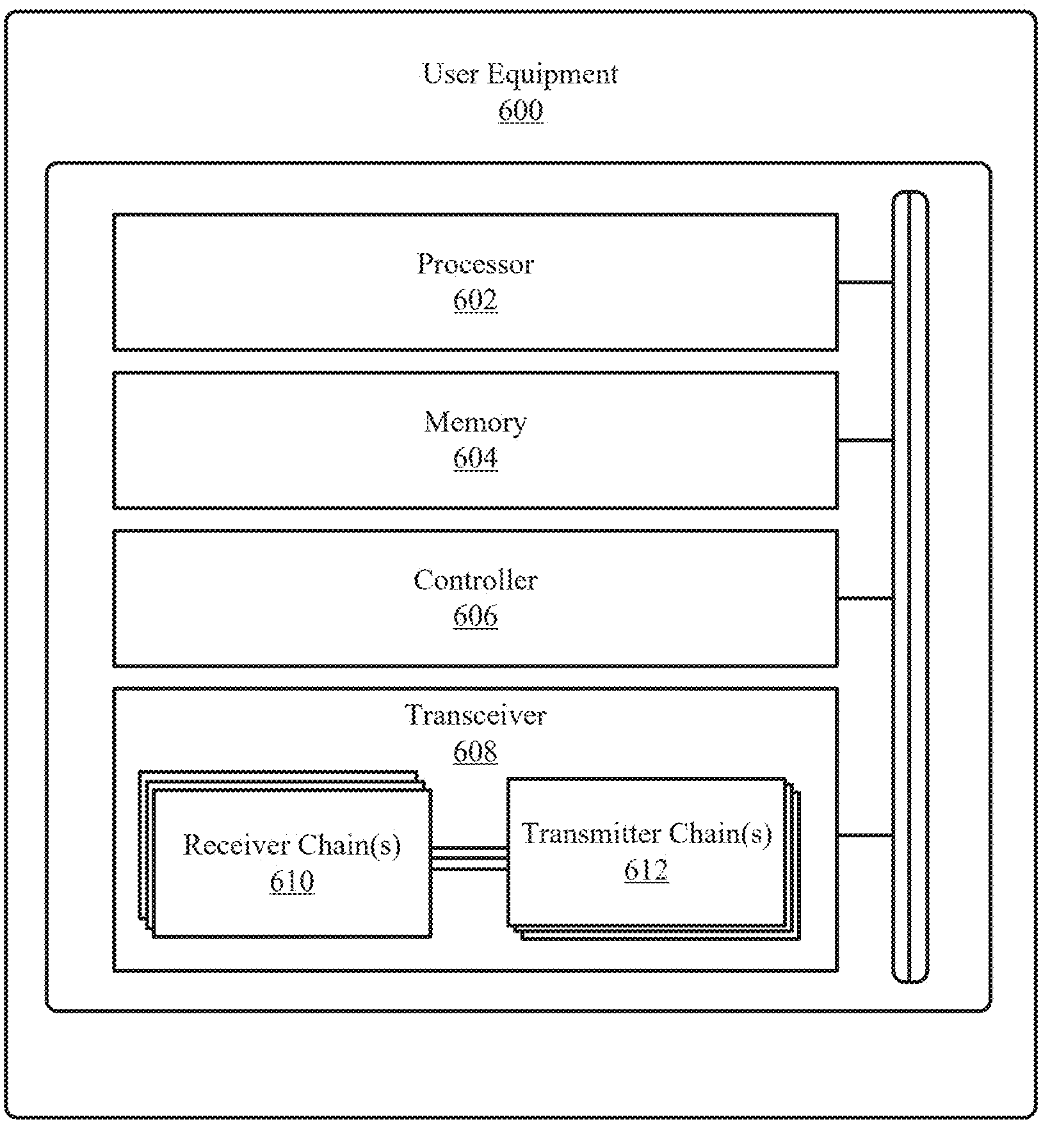
FIG. 6 illustrates an example of a UE in accordance with aspects of the present disclosure.

FIG. 6 illustrates an example of a UE 600 in accordance with aspects of the present disclosure. The UE 600 may include a processor 602, a memory 604, a controller 606, and a transceiver 608. The processor 602, the memory 604, the controller 606, or the transceiver 608, or various combinations thereof or various components thereof may be examples of means for performing various aspects of the present disclosure as described herein. These components may be coupled (e.g., operatively, communicatively, functionally, electronically, electrically) via one or more interfaces.

The processor 602, the memory 604, the controller 606, or the transceiver 608, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 602 may include an intelligent hardware device (e.g., a general-purpose processor, a DSP, a CPU, an ASIC, an FPGA, or any combination thereof). In some implementations, the processor 602 may be configured to operate the memory 604. In some other implementations, the memory 604 may be integrated into the processor 602. The processor 602 may be configured to execute computer-readable instructions stored in the memory 604 to cause the UE 600 to perform various functions of the present disclosure.

The memory 604 may include volatile or non-volatile memory. The memory 604 may store computer-readable, computer-executable code including instructions when executed by the processor 602 cause the UE 600 to perform various functions described herein. The code may be stored in a non-transitory computer-readable medium such as the memory 604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 602 and the memory 604 coupled with the processor 602 may be configured to cause the UE 600 to perform one or more of the functions described herein (e.g., executing, by the processor 602, instructions stored in the memory 604). For example, the processor 602 may support wireless communication at the UE 600 in accordance with examples as disclosed herein. The UE 600 may be configured to or operable to support a means for transmitting, to an ADAES, a request for analytics data via an API, the API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier; and receiving a response to the request for the analytics data from the ADAES.

Additionally, the UE 600 may be configured to support any one or combination of the request includes a resource configuration that indicates a type of the analytics data for at least one of a data analytics service or an application; and transmitting the request for the analytics data of the at least one service or application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The method further comprising transmitting the request to the ADAES as a subscription request of an event; and receiving the response from the ADAES with an indication of acceptance of the subscription request. The method further comprising transmitting the request to the ADAES for the analytics data as the request for historical analytics data; and receiving the response of the historical analytics data from the ADAES. The method further comprising receiving, from the ADAES, the response to the request for the analytics data via the API by which the request was transmitted, the API configured with an extension that indicates a type of the response. The UE is an analytics consumer requesting the analytics data for UE-to-UE application performance analytics. The UE is an analytics consumer requesting the analytics data for location accuracy analytics. The UE is an analytics consumer requesting the analytics data for application performance analytics.

Additionally, or alternatively, the UE 600 may support at least one memory and at least one processor coupled with the at least one memory and configured to cause the UE to: transmit, to an ADAES, a request for analytics data via an API, the API configured as at least one of: a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier; and receive a response to the request for the analytics data from the ADAES.

Additionally, the UE 600 may be configured to support any one or combination of the request includes a resource configuration that indicates a type of the analytics data for at least one of a data analytics service or an application; and the at least one processor is configured to cause the UE to transmit the request for the analytics data of the at least one service or application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The at least one processor is configured to cause the UE to transmit the request to the ADAES as a subscription request of an event; and receive the response from the ADAES with an indication of acceptance of the subscription request. The at least one processor is configured to cause the UE to transmit the request to the ADAES for the analytics data as the request for historical analytics data; and receive the response of the historical analytics data from the ADAES. The at least one processor is configured to cause the UE to receive, from the ADAES, the response to the request for the analytics data via the API by which the request was transmitted, the API configured with an extension that indicates a type of the response. The UE is an analytics consumer requesting the analytics data for UE-to-UE application performance analytics. The UE is an analytics consumer requesting the analytics data for location accuracy analytics. The UE is an analytics consumer requesting the analytics data for application performance analytics.

The controller 606 may manage input and output signals for the UE 600. The controller 606 may also manage peripherals not integrated into the UE 600. In some implementations, the controller 606 may utilize an operating system such as iOS®, ANDROID®, WINDOWS®, or other operating systems. In some implementations, the controller 606 may be implemented as part of the processor 602.

In some implementations, the UE 600 may include at least one transceiver 608. In some other implementations, the UE 600 may have more than one transceiver 608. The transceiver 608 may represent a wireless transceiver. The transceiver 608 may include one or more receiver chains 610, one or more transmitter chains 612, or a combination thereof.

A receiver chain 610 may be configured to receive signals (e.g., control information, data, packets) over a wireless medium. For example, the receiver chain 610 may include one or more antennas to receive a signal over the air or wireless medium. The receiver chain 610 may include at least one amplifier (e.g., a low-noise amplifier (LNA)) configured to amplify the received signal. The receiver chain 610 may include at least one demodulator configured to demodulate the receive signal and obtain the transmitted data by reversing the modulation technique applied during transmission of the signal. The receiver chain 610 may include at least one decoder for decoding the demodulated signal to receive the transmitted data.

A transmitter chain 612 may be configured to generate and transmit signals (e.g., control information, data, packets). The transmitter chain 612 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 612 may also include at least one power amplifier configured to amplify the modulated signal to an appropriate power level suitable for transmission over the wireless medium. The transmitter chain 612 may also include one or more antennas for transmitting the amplified signal into the air or wireless medium.

Figure 7:
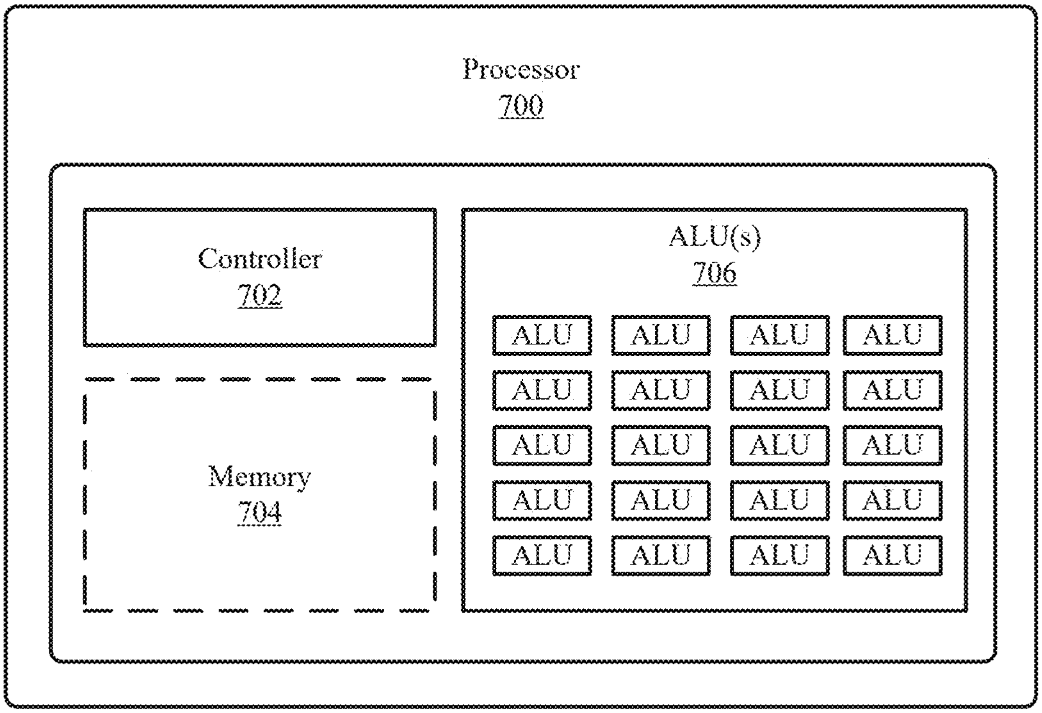
FIG. 7 illustrates an example of a processor in accordance with aspects of the present disclosure.

FIG. 7 illustrates an example of a processor 700 in accordance with aspects of the present disclosure. The processor 700 may be an example of a processor configured to perform various operations in accordance with examples as described herein. The processor 700 may include a controller 702 configured to perform various operations in accordance with examples as described herein. The processor 700 may optionally include at least one memory 704, which may be, for example, an L1/L2/L3 cache. Additionally, or alternatively, the processor 700 may optionally include one or more arithmetic-logic units (ALUs) 706. One or more of these components may be in electronic communication or otherwise coupled (e.g., operatively, communicatively, functionally, electronically, electrically) via one or more interfaces (e.g., buses).

The processor 700 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 700) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 702 may be configured to manage and coordinate various operations (e.g., signaling, receiving, obtaining, retrieving, transmitting, outputting, forwarding, storing, determining, identifying, accessing, writing, reading) of the processor 700 to cause the processor 700 to support various operations in accordance with examples as described herein. For example, the controller 702 may operate as a control unit of the processor 700, generating control signals that manage the operation of various components of the processor 700. These control signals include enabling or disabling functional units, selecting data paths, initiating memory access, and coordinating timing of operations.

The controller 702 may be configured to fetch (e.g., obtain, retrieve, receive) instructions from the memory 704 and determine subsequent instruction(s) to be executed to cause the processor 700 to support various operations in accordance with examples as described herein. The controller 702 may be configured to track memory addresses of instructions associated with the memory 704. The controller 702 may be configured to decode instructions to determine the operation to be performed and the operands involved. For example, the controller 702 may be configured to interpret the instruction and determine control signals to be output to other components of the processor 700 to cause the processor 700 to support various operations in accordance with examples as described herein. Additionally, or alternatively, the controller 702 may be configured to manage flow of data within the processor 700. The controller 702 may be configured to control transfer of data between registers, ALUs 706, and other functional units of the processor 700.

The memory 704 may include one or more caches (e.g., memory local to or included in the processor 700 or other memory, such as RAM, ROM, DRAM, SDRAM, SRAM, MRAM, flash memory, etc. In some implementations, the memory 704 may reside within or on a processor chipset (e.g., local to the processor 700). In some other implementations, the memory 704 may reside external to the processor chipset (e.g., remote to the processor 700).

The memory 704 may store computer-readable, computer-executable code including instructions that, when executed by the processor 700, cause the processor 700 to perform various functions described herein. The code may be stored in a non-transitory computer-readable medium such as system memory or another type of memory. The controller 702 and/or the processor 700 may be configured to execute computer-readable instructions stored in the memory 704 to cause the processor 700 to perform various functions. For example, the processor 700 and/or the controller 702 may be coupled with or to the memory 704, the processor 700, and the controller 702, and may be configured to perform various functions described herein. In some examples, the processor 700 may include multiple processors and the memory 704 may include multiple memories. One or more of the multiple processors may be coupled with one or more of the multiple memories, which may, individually or collectively, be configured to perform various functions herein.

The one or more ALUs 706 may be configured to support various operations in accordance with examples as described herein. In some implementations, the one or more ALUs 706 may reside within or on a processor chipset (e.g., the processor 700). In some other implementations, the one or more ALUs 706 may reside external to the processor chipset (e.g., the processor 700). One or more ALUs 706 may perform one or more computations such as addition, subtraction, multiplication, and division on data. For example, one or more ALUs 706 may receive input operands and an operation code, which determines an operation to be executed. One or more ALUs 706 may be configured with a variety of logical and arithmetic circuits, including adders, subtractors, shifters, and logic gates, to process and manipulate the data according to the operation. Additionally, or alternatively, the one or more ALUs 706 may support logical operations such as AND, OR, exclusive-OR (XOR), not-OR (NOR), and not-AND (NAND), enabling the one or more ALUs 706 to handle conditional operations, comparisons, and bitwise operations.

The processor 700 may support wireless communication in accordance with examples as disclosed herein. The processor 700 may be configured to or operable to support at least one controller coupled with at least one memory and configured to cause the processor to: transmit, to an ADAES, a request for analytics data via an API, the API configured as at least one of: a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier; and receive a response to the request for the analytics data from the ADAES.

Additionally, the processor 700 may be configured to or operable to support any one or combination of the request includes a resource configuration that indicates a type of the analytics data for at least one of a data analytics service or an application; and the at least one controller is configured to cause the processor to transmit, via the API, the request for at least one of the analytics data of the data analytics service or the application. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The at least one controller is configured to cause the processor to transmit the request to the ADAES as a subscription request of an event; and receive the response from the ADAES with an indication of acceptance of the subscription request. The at least one controller is configured to cause the processor to transmit the request to the ADAES for the analytics data as the request for historical analytics data; and receive the response of the historical analytics data from the ADAES. The at least one controller is configured to cause the processor to receive, from the ADAES, the response to the request for the analytics data via the API by which the request was transmitted, the API configured with an extension that indicates a type of the response. The processor of a UE is an analytics consumer requesting the analytics data for UE-to-UE application performance analytics. The processor of a UE is an analytics consumer requesting the analytics data for location accuracy analytics. The processor of a UE is an analytics consumer requesting the analytics data for application performance analytics.

Figure 8:
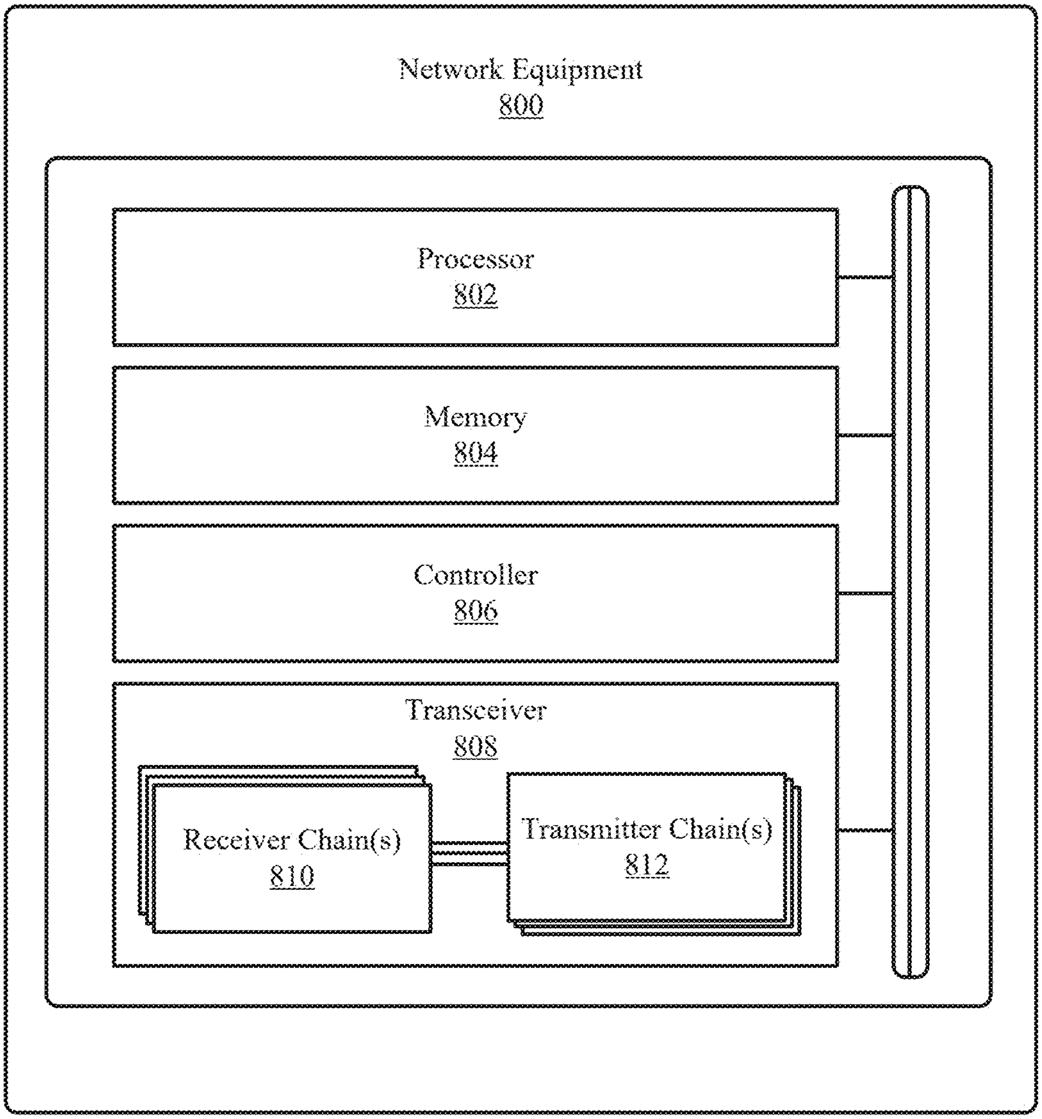
FIG. 8 illustrates an example of a NE in accordance with aspects of the present disclosure.

FIG. 8 illustrates an example of a NE 800 in accordance with aspects of the present disclosure. The NE 800 may include a processor 802, a memory 804, a controller 806, and a transceiver 808. The processor 802, the memory 804, the controller 806, or the transceiver 808, or various combinations thereof or various components thereof may be examples of means for performing various aspects of the present disclosure as described herein. These components may be coupled (e.g., operatively, communicatively, functionally, electronically, electrically) via one or more interfaces.

The processor 802, the memory 804, the controller 806, or the transceiver 808, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 802 may include an intelligent hardware device (e.g., a general-purpose processor, a DSP, a CPU, an ASIC, an FPGA, or any combination thereof). In some implementations, the processor 802 may be configured to operate the memory 804. In some other implementations, the memory 804 may be integrated into the processor 802. The processor 802 may be configured to execute computer-readable instructions stored in the memory 804 to cause the NE 800 to perform various functions of the present disclosure.

The memory 804 may include volatile or non-volatile memory. The memory 804 may store computer-readable, computer-executable code including instructions when executed by the processor 802 cause the NE 800 to perform various functions described herein. The code may be stored in a non-transitory computer-readable medium such as the memory 804 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 802 and the memory 804 coupled with the processor 802 may be configured to cause the NE 800 to perform one or more of the functions described herein (e.g., executing, by the processor 802, instructions stored in the memory 804). For example, the processor 802 may support wireless communication at the NE 800 in accordance with examples as disclosed herein. The NE 800 may be configured to or operable to support a means for receiving, from an analytics consumer, a request for analytics data via an API, the API configured as at least one of: a single API via which multiple events are accessible, where each of the multiple events are distinguishable by an event-specific identifier; or multiple APIs by which one event of the multiple events is accessible via one of the multiple APIs, and the one event is distinguishable by an API specific identifier and the event-specific identifier; and transmitting a response to the request for the analytics data to the analytics consumer.

Additionally, the NE 800 may be configured to or operable to support any one or combination of the request includes a resource configuration that indicates a type of the analytics data for at least one of a data analytics service or an application; and receiving the request for the analytics data of at least one of the service or the application via the API. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The method further comprising receiving the request from the analytics consumer as a subscription request of an event; transmitting a session request for the analytics consumer to an ADAEC; receiving session confirmation from the ADAEC; and transmitting the response to the analytics consumer with an indication of acceptance of the subscription request. The method further comprising: receiving the request from the analytics consumer for the analytics data as the request for historical analytics data; transmitting an analytics request to an A-ADRF for the historical analytics data; receiving the historical analytics data from the A-ADRF; and transmitting the response of the historical analytics data to the analytics consumer. The method further comprising transmitting, to the analytics consumer, the response to the request for the analytics data via the API by which the request was received, the API configured with an extension that indicates a type of the response. The NE is an ADAES, and the analytics consumer is a VAL server requesting the analytics data for at least one of VAL server performance analytics or VAL session performance analytics. The NE is an ADAES, and the analytics consumer is a UE requesting the analytics data for UE-to-UE application performance analytics. The NE is an ADAES, and the analytics consumer is an application requesting the analytics data for at least one of slice-specific performance analytics, location accuracy analytics, service API analytics, network slice usage pattern analytics, edge load analytics, or application performance analytics.

Additionally, or alternatively, the NE 800 may support at least one memory and at least one processor coupled with the at least one memory and configured to cause the NE to: receive, from an analytics consumer, a request for analytics data via an API, the API configured as at least one of: a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier; and transmit a response to the request for the analytics data to the analytics consumer.

Additionally, the NE 800 may be configured to support any one or combination of the request includes a resource configuration that indicates a type of the analytics data for at least one of a data analytics service or an application; and the at least one processor is configured to cause the NE to receive, via the API, the request for at least one of the analytics data of the data analytics service, or the analytics data of the application. A configuration of the single API comprises a suffix identifying a resource that is applied to a method for a service event or an application event. A configuration of the multiple APIs comprises a suffix identifying the one of the multiple APIs and a resource that is applied to a method for a service event or an application event. The single API via which multiple services are accessible is structured as {apiRoot}/<apiName>/<apiVersion>/<apiSpecificSuffixeswithServices>, where the <apiSpecificSuffixeswithServices> comprises one or more data analytics services; and the multiple APIs by which the one event of the multiple events is accessible is structured as {apiRoot}/<apiName_i>/<apiVersion>/<apiSpecificSuffixes>, where the <apiSpecificSuffixes> is independent of a data analytics service. The at least one processor is configured to cause the NE to receive the request from the analytics consumer as a subscription request of an event; transmit a session request for the analytics consumer to an ADAEC; receive session confirmation from the ADAEC; and transmit the response to the analytics consumer with an indication of acceptance of the subscription request. The at least one processor is configured to cause the NE to: receive the request from the analytics consumer for the analytics data as the request for historical analytics data; transmit an analytics request to an A-ADRF for the historical analytics data; receive the historical analytics data from the A-ADRF; and transmit the response of the historical analytics data to the analytics consumer. The at least one processor is configured to cause the NE to transmit, to the analytics consumer, the response to the request for the analytics data via the API by which the request was received, the API configured with an extension that indicates a type of the response. The NE is an ADAES, and the analytics consumer is a VAL server requesting the analytics data for at least one of VAL server performance analytics or VAL session performance analytics. The NE is an ADAES, and the analytics consumer is an application requesting the analytics data for slice-specific performance analytics. The NE is an ADAES, and the analytics consumer is a UE requesting the analytics data for UE-to-UE application performance analytics. The NE is an ADAES, and the analytics consumer is an application requesting the analytics data for location accuracy analytics. The NE is an ADAES, and the analytics consumer is an application requesting the analytics data for service API analytics. The NE is an ADAES, and the analytics consumer is an application requesting the analytics data for network slice usage pattern analytics. The NE is an ADAES, and the analytics consumer is an application requesting the analytics data for edge load analytics. The NE is an ADAES, and the analytics consumer is an application requesting the analytics data for application performance analytics.

The controller 806 may manage input and output signals for the NE 800. The controller 806 may also manage peripherals not integrated into the NE 800. In some implementations, the controller 806 may utilize an operating system such as iOS®, ANDROID®, WINDOWS®, or other operating systems. In some implementations, the controller 806 may be implemented as part of the processor 802.

In some implementations, the NE 800 may include at least one transceiver 808. In some other implementations, the NE 800 may have more than one transceiver 808. The transceiver 808 may represent a wireless transceiver. The transceiver 808 may include one or more receiver chains 810, one or more transmitter chains 812, or a combination thereof.

A receiver chain 810 may be configured to receive signals (e.g., control information, data, packets) over a wireless medium. For example, the receiver chain 810 may include one or more antennas to receive a signal over the air or wireless medium. The receiver chain 810 may include at least one amplifier (e.g., a low-noise amplifier (LNA)) configured to amplify the received signal. The receiver chain 810 may include at least one demodulator configured to demodulate the receive signal and obtain the transmitted data by reversing the modulation technique applied during transmission of the signal. The receiver chain 810 may include at least one decoder for decoding the demodulated signal to receive the transmitted data.

A transmitter chain 812 may be configured to generate and transmit signals (e.g., control information, data, packets). The transmitter chain 812 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 812 may also include at least one power amplifier configured to amplify the modulated signal to an appropriate power level suitable for transmission over the wireless medium. The transmitter chain 812 may also include one or more antennas for transmitting the amplified signal into the air or wireless medium.

Figure 9:
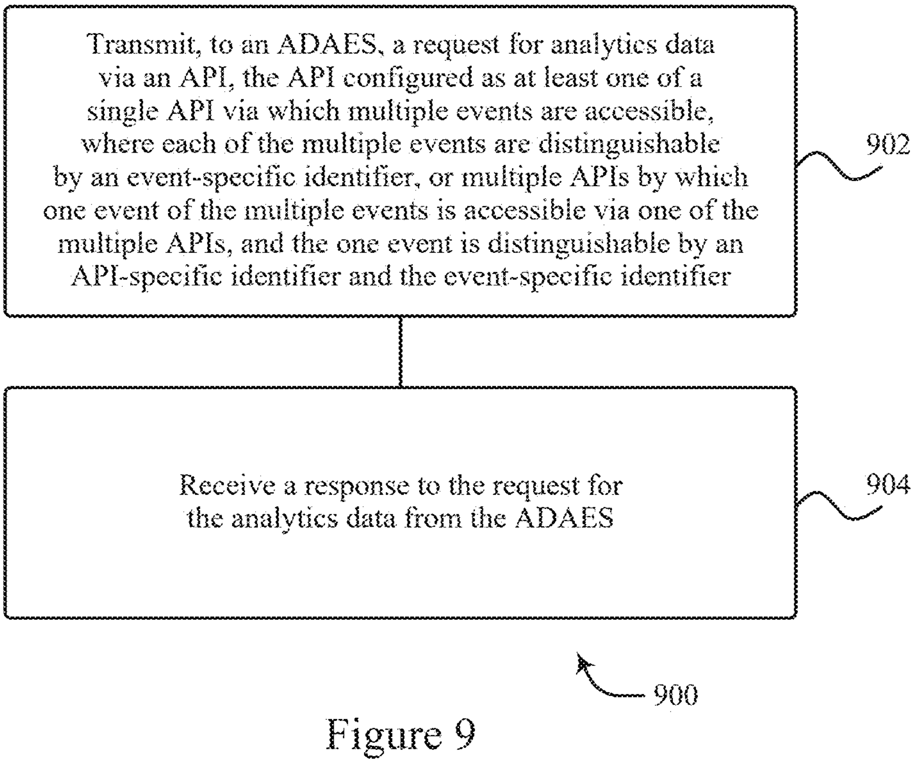
FIG. 9 illustrates a flowchart of a method performed by a UE in accordance with aspects of the present disclosure.

FIG. 9 illustrates a flowchart of a method 900 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 902, the method may include transmitting, to an ADAES, a request for analytics data via an API, the API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API-specific identifier and the event-specific identifier. The operations of 902 may be performed in accordance with examples as described herein. In some implementations, aspects of the operations of 902 may be performed by a UE as described with reference to FIG. 6.

At 904, the method may include receiving a response to the request for the analytics data from the ADAES. The operations of 904 may be performed in accordance with examples as described herein. In some implementations, aspects of the operations of 904 may be performed by a UE as described with reference to FIG. 6.

Figure 10:
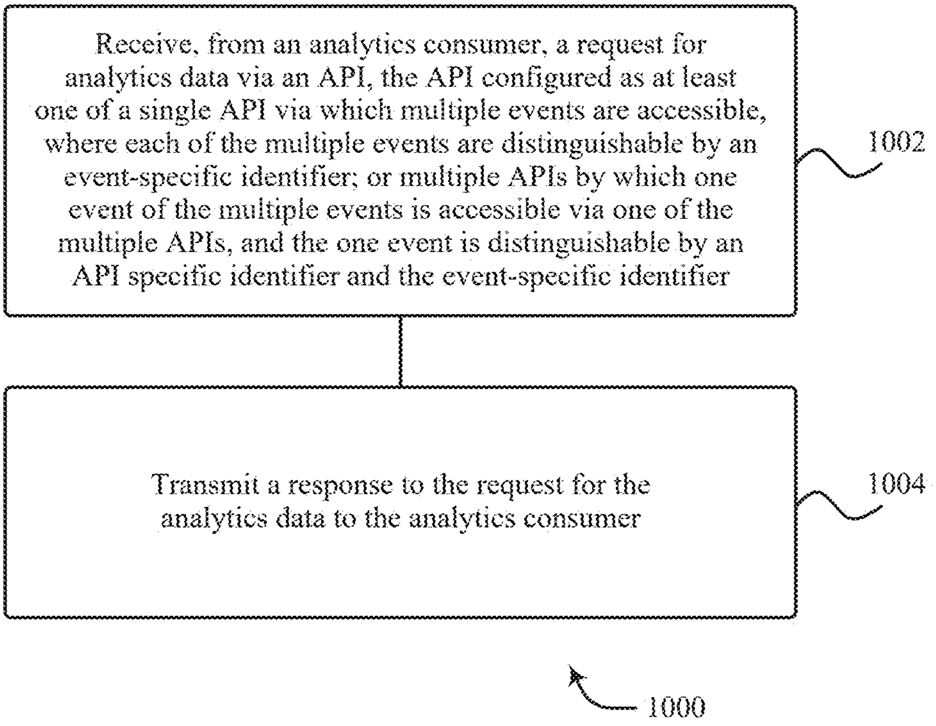
FIG. 10 illustrates a flowchart of a method performed by a NE in accordance with aspects of the present disclosure.

FIG. 10 illustrates a flowchart of a method 1000 in accordance with aspects of the present disclosure. The operations of the method may be implemented by a NE as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 1002, the method may include receiving, from an analytics consumer, a request for analytics data via an API, the API configured as at least one of a single API via which multiple events are accessible, where each of the multiple events are distinguishable by an event-specific identifier; or multiple APIs by which one event of the multiple events is accessible via one of the multiple APIs, and the one event is distinguishable by an API specific identifier and the event-specific identifier. The operations of 1002 may be performed in accordance with examples as described herein. In some implementations, aspects of the operations of 1002 may be performed by a NE as described with reference to FIG. 8.

At 1004, the method may include transmitting a response to the request for the analytics data to the analytics consumer. The operations of 1004 may be performed in accordance with examples as described herein. In some implementations, aspects of the operations of 1004 may be performed by a NE as described with reference to FIG. 8.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network equipment (NE) for wireless communication, comprising:
- at least one memory; and
- at least one processor coupled with the at least one memory and configured to cause the NE to:
  - receive, from an analytics consumer, a request for analytics data via an application program interface (API), the API configured as at least one of:
    - a single API via which multiple events are accessible, wherein each of the multiple events are distinguishable by an event-specific identifier; or
    - multiple APIs by which one event of the multiple events is accessible via one of the multiple APIs, and the one event is distinguishable by an API-specific identifier and the event-specific identifier; and
  - transmit, to the analytics consumer, a response to the request for the analytics data via the API by which the request for the analytics data was received, wherein the API is configured with an extension that indicates a type of the response.

2. The NE of claim 1, wherein the request includes a resource configuration that indicates a type of the analytics data for at least one of a data analytics service or an application, and the at least one processor is configured to cause the NE to: receive, via the API, the request for at least one of the analytics data of the data analytics service, or the analytics data of the application.

3. The NE of claim 1, wherein a configuration of the single API comprises a suffix identifying a resource that is applied to a method for a service event or an application event.

4. The NE of claim 1, wherein a configuration of the multiple APIs comprises a suffix identifying the one of the multiple APIs and a resource that is applied to a method for a service event or an application event.

5. The NE of claim 1, wherein:

the single API via which multiple services are accessible is structured as {apiRoot}/<apiName>/<apiVersion>/<apiSpecificSuffixeswithServices>, wherein <apiSpecificSuffixeswithServices> comprises one or more data analytics services; and the multiple APIs by which the one event of the multiple events is accessible are structured as {apiRoot}/<apiName_i>/<apiVersion>/<apiSpecificSuffixes>, wherein <apiSpecificSuffixes> is independent of a data analytics service.

6. The NE of claim 1, wherein the at least one processor is configured to cause the NE to:

receive the request from the analytics consumer as a subscription request of an event;

transmit a session request for the analytics consumer to an application data analytics enabler client (ADAEC);

receive session confirmation from the ADAEC; and transmit the response to the analytics consumer with an indication of acceptance of the subscription request.

7. The NE of claim 1, wherein the at least one processor is configured to cause the NE to:

receive the request from the analytics consumer for the analytics data as the request for historical analytics data;

transmit an analytics request to an application layer-analytical data repository function (A-ADRF) for the historical analytics data;

receive the historical analytics data from the A-ADRF; and transmit the response of the historical analytics data to the analytics consumer.

8. The NE of claim 1, wherein the NE is an application data analytics enabler server (ADAES), and the analytics consumer is a vertical application layer (VAL) server requesting the analytics data for at least one of VAL server performance analytics or VAL session performance analytics.

9. The NE of claim 1, wherein the NE is an application data analytics enabler server (ADAES), and the analytics consumer is an application requesting the analytics data for slice-specific performance analytics.

10. The NE of claim 1, wherein the NE is an application data analytics enabler server (ADAES), and the analytics consumer is a user equipment (UE) requesting the analytics data for UE-to-UE application performance analytics.

11. The NE of claim 1, wherein the NE is an application data analytics enabler server (ADAES), and the analytics consumer is an application requesting the analytics data for one or more of location accuracy analytics, service API analytics, network slice usage pattern analytics, edge load analytics, or application performance analytics.

12. A method performed by a network equipment (NE), the method comprising:

receiving, from an analytics consumer, a request for analytics data via an application program interface (API), the API configured as at least one of:

a single API via which multiple events are accessible, wherein each of the multiple events are distinguishable by an event-specific identifier; or multiple APIs by which one event of the multiple events is accessible via one of the multiple APIs, and the one event is distinguishable by an API-specific identifier and the event-specific identifier; and transmitting, to the analytics consumer, a response to the request for the analytics data via the API by which the request for the analytics data was received, wherein the API is configured with an extension that indicates a type of the response.

13. A user equipment (UE) for wireless communication, comprising:

at least one memory; and at least one processor coupled with the at least one memory and configured to cause the UE to:

transmit, to an application data analytics enabler server (ADAES), a request for analytics data via an application program interface (API), the API configured as at least one of:

a single API via which multiple events are accessible, wherein each of the multiple events are distinguishable by an event-specific identifier; or multiple APIs by which one event of the multiple events is accessible via one of the multiple APIs, and the one event is distinguishable by an API-specific identifier and the event-specific identifier; and receive, from the ADAES, a response to the request for the analytics data via the API by which the request for the analytics data was transmitted, wherein the API is configured with an extension that indicates a type of the response.

14. The UE of claim 13, wherein the request includes a resource configuration that indicates a type of the analytics data for at least one of a data analytics service or an application, and the at least one processor is further operable to cause the UE to: transmit, via the API, the request for at least one of the analytics data of the data analytics service or the application.

15. A method performed by a user equipment (UE), the method comprising:

transmitting, to an application data analytics enabler server (ADAES), a request for analytics data via an application program interface (API), the API configured as at least one of:

a single API via which multiple events are accessible, wherein each of the multiple events are distinguishable by an event-specific identifier; or multiple APIs by which one event of the multiple events is accessible via one of the multiple APIs, and the one event is distinguishable by an API-specific identifier and the event-specific identifier; and receiving, from the ADAES, a response to the request for the analytics data via the API by which the request for the analytics data was transmitted, wherein the API is configured with an extension that indicates a type of the response.

16. The method of claim 15, wherein the request includes a resource configuration that indicates a type of the analytics data for at least one of a data analytics service or an application, and the method further comprises: transmitting, via the API, the request for at least one of the analytics data of the data analytics service or the application.

17. The method of claim 15, wherein a configuration of the single API comprises a suffix identifying a resource that is applied to a method for a service event or an application event.

18. The method of claim 15, wherein a configuration of the single API comprises a suffix identifying the one of the multiple APIs and a resource that is applied to a method for a service event or an application event.

19. The processer method of claim 15, wherein:

the single API via which multiple services are accessible is structured as {apiRoot}/<apiName>/<apiVersion>/<apiSpecificSuffixeswithServices>, wherein <apiSpecificSuffixeswithServices> comprises one or more data analytics services; and the multiple APIs by which the one event of the multiple events is accessible are structured as {apiRoot}/<apiName_i>/<apiVersion>/<apiSpecificSuffixes>, wherein <apiSpecificSuffixes> is independent of a data analytics service.

20. The method of claim 15, further comprising:

transmitting the request to the ADAES as a subscription request of an event; and receiving the response from the ADAES with an indication of acceptance of the subscription request.

* * * * *